United States Patent [19]

Flint

[11] 4,200,224
[45] Apr. 29, 1980

[54] METHOD AND SYSTEM FOR ISOLATING FAULTS IN A MICROPROCESSOR AND A MACHINE CONTROLLED BY THE MICROPROCESSOR

[75] Inventor: John R. Flint, Barrington, Ill.

[73] Assignee: Bell & Howell Company, Chicago, Ill.

[21] Appl. No.: 935,413

[22] Filed: Aug. 21, 1978

[51] Int. Cl.² .............................................. G06F 11/00
[52] U.S. Cl. .................................. 371/18; 324/73 R; 371/20
[58] Field of Search ......... 235/302; 324/73 R, 73 AT

[56] References Cited

U.S. PATENT DOCUMENTS

| | | | |
|---|---|---|---|
| 3,831,149 | 8/1974 | Job | 235/302 X |
| 3,924,109 | 12/1975 | Jhu et al. | 235/302 |
| 4,125,763 | 11/1978 | Drabing et al. | 235/302 |

Primary Examiner—David H. Malzahn
Attorney, Agent, or Firm—Alan B. Samlan; John H. Moore

[57] ABSTRACT

Apparatus and method for testing the operability of a microprocessor and a machine controlled by the microprocessor are described. The input/output ports of the microprocessor are tested by propagating, via a test program in the microprocessor, a test logic level along the ports of the microprocessor. As the test logic level propagates, its position is revealed by the successive energization of adjacent light-emissive devices which are external to the microprocessor but connected to the microprocessor ports. Proper propagation of the test logic level is indicated by a corresponding propagation of light across the light-emissive devices. To test the machine, the microprocessor is put in a quiescent but energized state and test logic levels are applied to the ports coupling data between the microprocessor and the machine. Selected functions of the machine are thus exercised independently of the microprocessor.

12 Claims, 11 Drawing Figures

| FIG. 5A | T F F F F F F F | REGISTER |
| FIG. 5B | T F F F T F F F | PORT 0 |
| FIG. 6A | F F F T F F F F | REGISTER |
| FIG. 6B | F F F T F F F F | PORT 0 |

MICROPROCESSOR TEST SEQUENCE

| START OF TEST SEQUENCE | PROPER VISUAL INDICATION |
| --- | --- |
| SET PORT 5=8∅, RESET MICROPROCESSOR, SET PORT 5=∅∅: | ALL I/O PORT BITS SHALL BE OFF. |

TEST 1

| SET PORT 5=∅1: | A SINGLE BIT WILL BE ON AND WILL PROPAGATE FROM BIT 7 TO BIT ∅ OF PORT ∅. |
| --- | --- |

TEST 2

| SET PORT 5=∅2: | A SINGLE BIT WILL BE ON AND WILL PROPAGATE FROM BIT 7 TO BIT ∅ OF PORT 1. |
| --- | --- |

TEST 3

| SET PORT 5=∅4: | A SINGLE BIT WILL BE ON AND WILL PROPAGATE FROM BIT 7 TO BIT ∅ OF PORT 4. |
| --- | --- |

TEST 4

| SET PORT 5=∅∅: | A SINGLE BIT WILL BE ON AND WILL PROPAGATE FROM BIT 7 TO BIT ∅ OF PORT 5. |
| --- | --- |

END OF MICROPROCESSOR TEST,
SET PORT 5=8∅,
RESET MICROPROCESSOR,
SET PORT 5=∅8,
SET PORT 5=∅∅.

FIG. 4

MACHINE TEST SEQUENCE

| TEST BOX SETTINGS | PROPER VISUAL INDICATOR |
| --- | --- |
| 1. SET PORT 5, BIT ∅ ON. | SOLENOID CLOSES. |
| 2. SET PORT 5, BITS 2 AND 5 ON, AND SET PORT ∅, BIT 5 ON. | MOTOR ON, CAMS A & B ROTATE, SWITCHES C & D CLOSE; PORT 1, BIT 2 LED CYCLES ON & OFF. |

FIG. 7

METHOD AND SYSTEM FOR ISOLATING FAULTS IN A MICROPROCESSOR AND A MACHINE CONTROLLED BY THE MICROPROCESSOR

BACKGROUND OF THE INVENTION

This invention relates generally to microprocessor controlled systems and in particular to systems for detecting faults in the microprocessor and in the machine which the microprocessor controls.

In recent years, many industrial and consumer machines have included a microprocessor to control machine operation. As a result, machine operation has been made more accurate and sometimes more complicated. In addition, microprocessors have become larger and more complex in order to meet the demand for more sophisticated machine control.

As a result of the increased complexity of microprocessors, it has become more difficult to isolate defects in both the microprocessor and the machine which is controlled thereby. In some instances, a defect which appears to be a malfunction of the machine may actually be a microprocessor malfunction. Conversely, an apparent microprocessor malfunction may actually be a malfunction of the machine.

Because of the uncertainty as to where a defect resides, it has been customary to physically remove the microprocessor in order to check the operation of the machine independently of the operation of the microprocessor. However, manual handling of the microprocessor may result in further damage to it, particularly to its input/output leads.

Another proposed solution to finding machine malfunctions is to incorporate a special program in the microprocessor by which the various functions of the machine are exercised. The drawback to this solution is that: (1) if the machine operates improperly under the special program, it may be either a microprocessor malfunction or a machine malfunction which is responsible; (2) the special test programs are usually incomplete or inadequate to completely test the machine, because it is impractical to have a test program for every possible machine failure; and (3) prior special test programs take up too much room in the microprocessor's memory. Hence, the prior solutions to isolating machine and/or microprocessor faults may lead to uncertainties and involve prolonged testing.

OBJECTS OF THE INVENTION

Accordingly, it is an object of the invention to provide an improved method and apparatus for checking the operability of a microprocessor.

It is another object of the invention to provide an improved method and apparatus for checking the operability of a microprocessor and a machine controlled by the microprocessor, whereby faults are isolated either in the microprocessor or the machine without manually handling the microprocessor.

BRIEF DESCRIPTION OF THE FIGURES

The objects stated above and other objects of the invention are more particularly set forth in the following detailed description and in the accompanying drawings of which:

FIG. 4 is an exemplary microprocessor test sequence instruction format for use by an operator in testing the microprocessor with the test device of FIG. 1;

FIGS. 5a, 5b, 6a, and 6b illustrate the logical status of a register in the microprocessor and the bits of a microprocessor input/output port, for use in explaining the operation of the invention; and FIG. 7 is an exemplary machine test sequence for testing a machine independently of the microprocessor.

SUMMARY OF THE INVENTION

According to the invention, a microprocessor which exercises programmed control over a machine is tested by a test program in the microprocessor and by means external to the microprocessor for initiating the test program and for generating a visual indication of the test results.

Typically, the microprocessor is coupled to the machine via one or more of the microprocessor's input/output ports, each such port having a plurality of input/output leads. Because a microprocessor fault usually results in a malfunction of one of its input/output leads, the test program tests those leads by writing a test logic level (a logic "true" for example) to a first lead of a selected input/output port for propagation of the test logic level along each lead of the selected input/output port. The writing of the test logic level is effected such that only a properly functioning input/output lead, i.e., one which is not stuck at a logical T (true) or a logic F (false) level, assumes the test logic level and then reverts to an opposite (F) logic level when the test logic level propagates to the next lead.

As the test logic level propagates along the selected input/output port, the logic level associated with each lead is sensed and a visual indication is generated to show which leads assume the test logic level.

Preferably, the same test sequence is applied to each input/output port of the microprocessor. If the test logic level propagates along each of the microprocessor's input/output ports, the microprocessor is operating properly. If the microprocessor is operating properly, it is then put in a quiescent state in which it is electrically connected to the machine but exercises no control over the machine. Then, by means external to the microprocessor, a machine-run logic level is applied to at least one port normally coupling logic levels from the microprocessor to the machine. The machine-run logic level is selected to effect a known function of the machine to determine if the machine is capable of carrying out that function properly. Machine-run logic levels may be applied to all other ports coupling logic from the microprocessor to the machine to step the machine through all its functions and a visual indication may be generated to show whether the machine is operating properly. Hence, the machine and the microprocessor are tested independently of each other to isolate fault conditions.

DESCRIPTION OF THE PREFERRED EMBODIMENT

Figure 1:
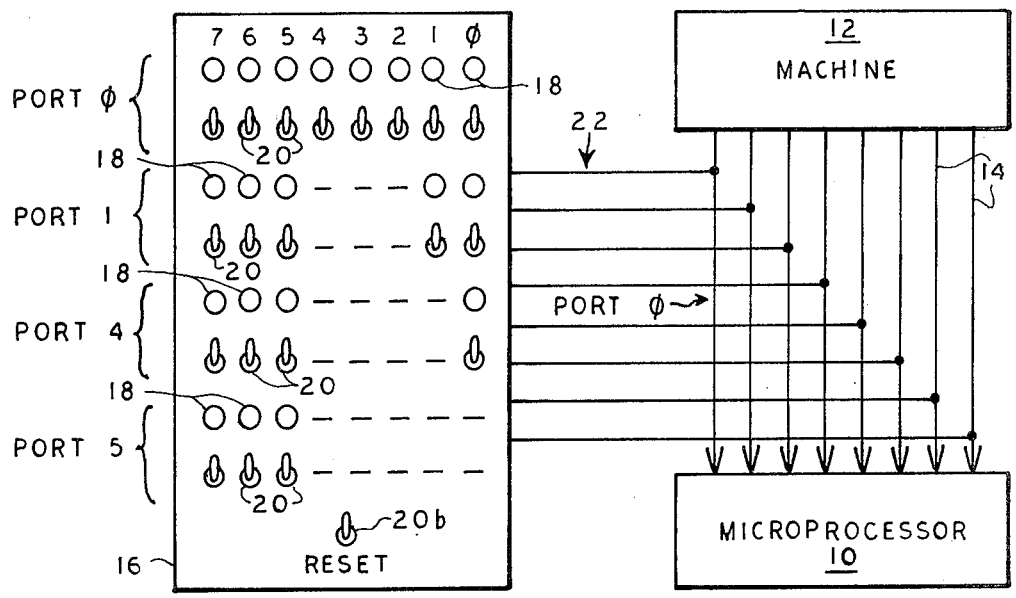
FIG. 1 illustrates an exemplary microprocessor coupled to a machine which the microprocessor controls, and a test device according to the invention for testing the microprocessor and/or the machine.

Referring now to FIG. 1, there is shown a microprocessor 10, preferably of the single chip variety, adapted to exercise programmed control over a machine 12. For purposes of this invention, the machine 12 may be of any type of appliance or machine, as long as at least some of its functions are controlled by the microprocessor.

As is well known in the art, each microprocessor includes one or more input/output ports, each such port including a plurality of input/output leads, each lead being associated with one bit of binary logic. Some such leads may be solely inputs to the microprocessor, solely outputs from the microprocessor, or bi-directional input/output leads. Because most microprocessor malfunctions arise from or result in a malfunction of an input/output lead, such as where the lead becomes stuck in a logic T or logic F state, the invention herein tests the ability of those leads to be set and cleared. If all the leads or bits can be set and cleared, chances are remote that the microprocessor is malfunctioning.

Referring again to FIG. 1, an exemplary input/output port designated port $\phi$ is shown as including 8 input/output leads, designated collectively as leads 14. As indicated in this example, all of the leads 14 may be inputs to the microprocessor by which the microprocessor senses the status of a particular machine function. Other input/output ports (not shown) may couple logic levels from the microprocessor to the machine to control the functions of the machine.

Also shown in FIG. 1 is a test box 16 used to initiate testing of the leads 14 and for generating a visual indication of their operability. In the example, the test box 16 includes 4 rows of light-emissive devices 18, preferably LEDs (light emitting diodes), and 4 rows of switches 20. The number of LEDs 18 and switches 20 in each row is preferably equal to the number of input/output leads 14 in each microprocessor port. Thus, each row of the test box includes eight LEDs and eight switches, each LED and the switch below it being associated with a particular input/output lead 14 in a particular port. For example, the topmost row of LEDs and the topmost row of switches are designated as being associated with port $\phi$ of the microprocessor. Along the top of the test box 16, column numbers are included to indicate which LED and switch of port $\phi$ is associated with which input/output lead 14. Thus, the rightmost LED and switch of port $\phi$ are associated with lead $\phi$ (the rightmost lead 14) and the leftmost LED and switch of port $\phi$ are associated with lead 7 (the leftmost lead 14).

As indicated on the test box 16, similar rows of LEDs and switches are associated with other ports (not shown) of the microprocessor, those other ports being designated as ports 1, 4 and 5.

Coupled from the test box 16 to the leads 14 are eight connectors 22, each of which is connected at one end to a lead 14 and at its other end to a switch and LED by a connection internal of the test box. As is described in more detail below, an LED is energized via its associated lead 22 whenever the lead 14 to which it is connected assumes a particular logic level, such as a logic T. In addition, each switch 20 is connected so as to impose a particular logic level on the lead 14 to which it is coupled via a connector 22.

Figure 2:
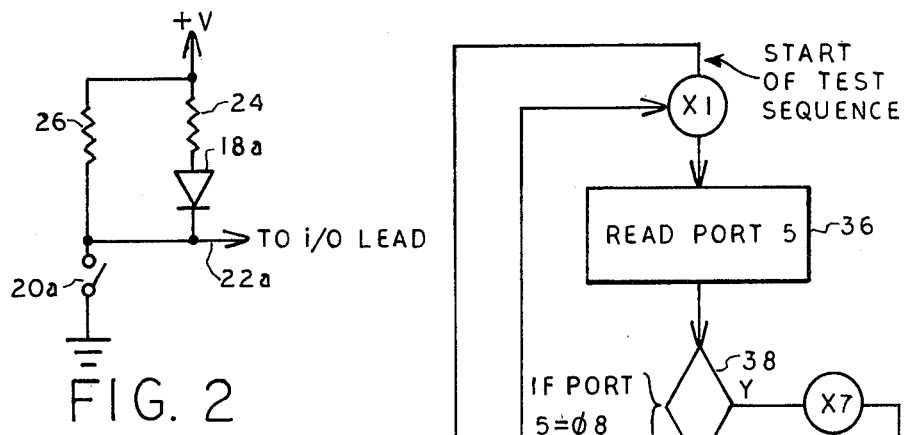
FIG. 2 is a schematic drawing of a switch and LED circuit used in the test device of FIG. 1.

Referring now to FIG. 2, there is shown the way in which each LED and its associated switch are connected to an input/output lead. An LED 18a is serially connected with a resistor 24 between a voltage source +V and a connector 22a leading to an input/output lead. Another resistor 26 parallels the LED 18a and the resistor 24. The switch 20a is coupled between a reference potential, shown as ground, and the connector 22a. By virtue of this arrangement, whenever a test logic level such as a logic T appears on an input/output lead to which connector 22a is coupled, the LED 18a is energized. Conversely, whenever an opposite logic level, such as a logic F appears, the LED 18a remains off. Thus, an operator is given a visual indication of the status of the input/output lead associated with the LED 18a.

The switch 20a provides means for imposing a specific logic level, a logic T, for example, on the input/output lead. When the LED 18a is coupled to the connector 22a with the switch 20a open, the LED 18a is controlled by the status of the associated input/output lead, but with the switch 20a closed, a logic T is imposed on that input/output lead. As will be apparent from the discussion below, the switch 20a may be closed to initiate a test program within the microprocessor or, with the microprocessor in a quiescent state, the closure of the switch 20a may exercise a known function of the machine 12 for testing the latter. During such testing, selected LEDs may energize to indicate the proper operating status of the machine. Preferably, each of the LEDs 18 and its associated switch 20 is connected as shown in FIG. 2 and all are enclosed in a single housing.

Referring again to the microprocessor 10, it will normally have been programmed with machine control instructions for controlling various functions of the machine 12. Presumably, both the instructions and the microprocessor are properly designed for the machine control desired. However, if a machine operates improperly, it may be due to a failure of the machine or a failure of the microprocessor, particularly a failure of one of the input/output leads.

To isolate the malfunction of the machine or the microprocessor, the microprocessor 10 includes a test program which, when used with a device such as the test box 16, isolates the malfunction. To initiate the test program, the connectors 22 of the test box 16 are coupled to the input/output leads of the microprocessor by any appropriate connector or adapter. Then a preselected switch 20 is closed to instruct the microprocessor to execute the test program. That test program may be designed to test a particular microprocessor and a particular machine. However, it is preferable to make the test program adaptable to any microprocessor and any machine, as with the present invention. That generality is made possible by coupling each input/output port of the microprocessor to the test box 16 and providing an LED 18, a switch 20, and a connector 22 for each input/output lead. Further, an instruction sheet is included for each microprocessor/machine combination to instruct an operator as to which switches 20 to operate in order to exercise the test program in that particular microprocessor and also to exercise the various functions of the particular machine. Accordingly, the same test box and the same kind of test program can be used for any microprocessor/machine combination, and the instruction sheet can be used to customize the test box 16 and the test program in the microprocessor to a particular microprocessor/machine combination. The more detailed discussion to follow will make the operation described above more evident.

Figure 3A:
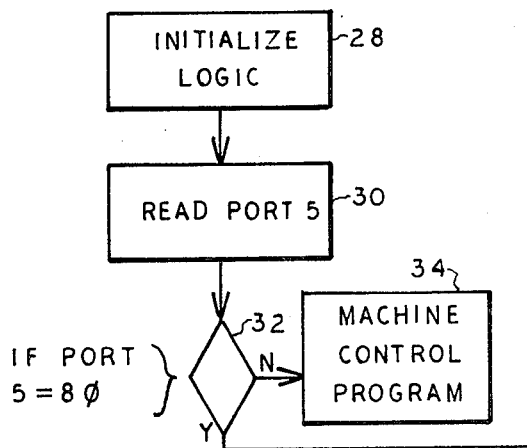
FIGS. 3a, 3b and 3c are flow charts illustrative of a preferred test program for the microprocessor.
Figure 3A:
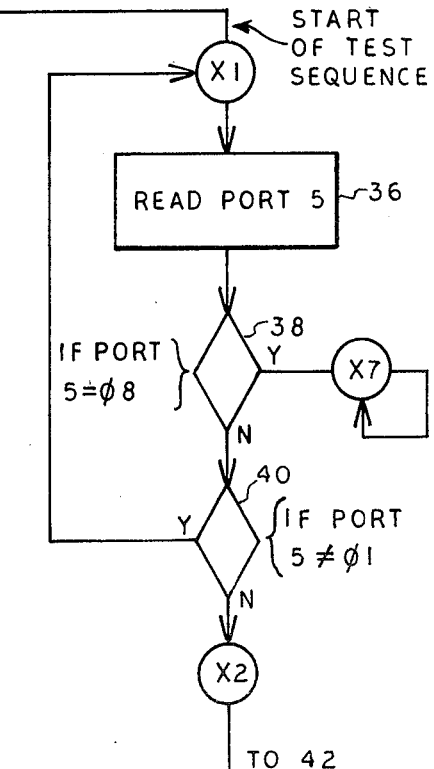
Figure 3B:
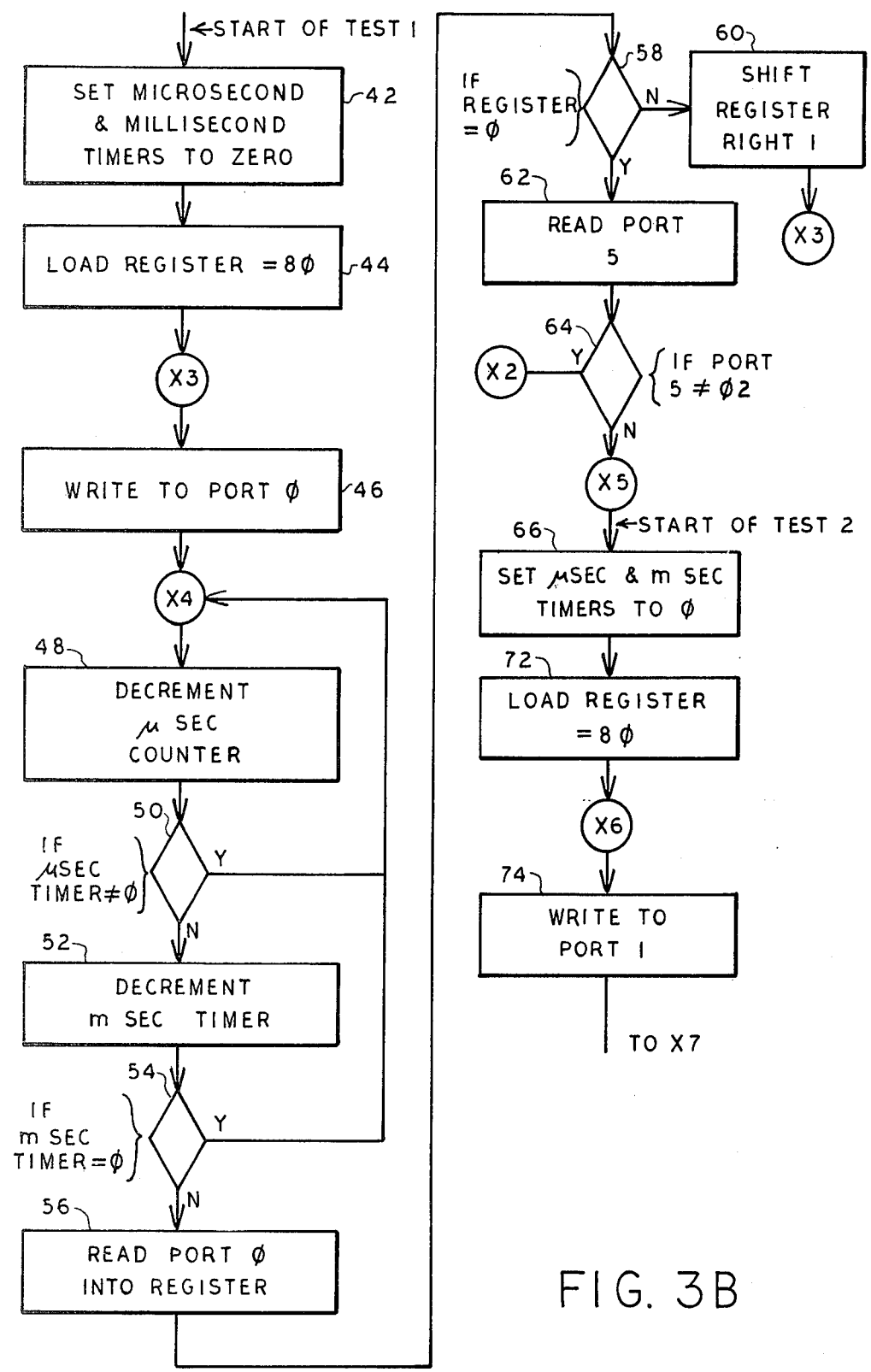
Figure 3C:
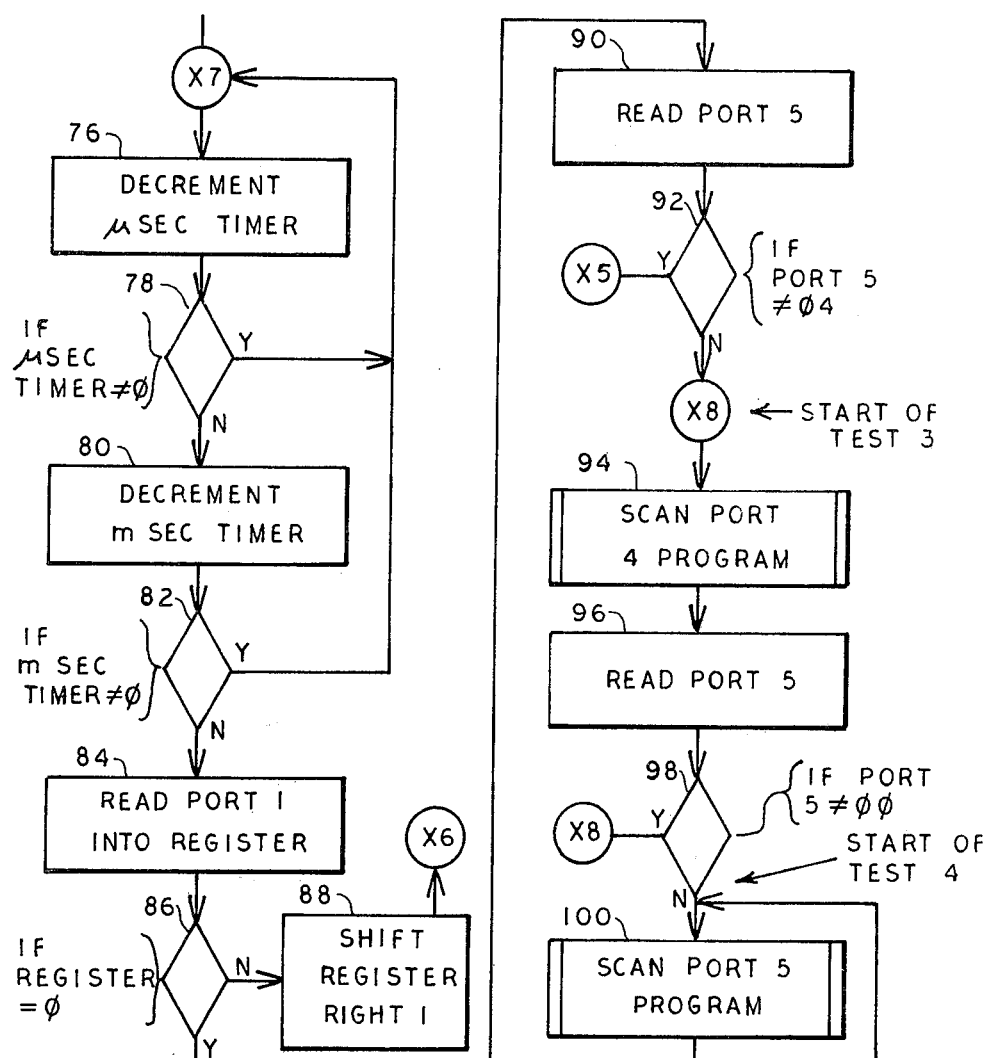

Referring now to FIGS. 3a, 3b and 3c there is shown an exemplary microprocessor program incorporating a test program for evaluating a typical microprocessor and its controlled machine. The program begins with the customary "initialize logic" instruction 28 for clearing or presetting all registers, counters, etc. Next, instruction 30 causes the microprocessor to read the logic level of port 5 (for a given microprocessor, any suitable port could be read). By instruction 32, the microprocessor is instructed to proceed to the machine control program 34 if port 5 does not equal 8$\phi$ (in hexadecimal notation). That program 34 includes all the instructions by which the microprocessor controls the function of the machine.

If port 5 does equal 8$\phi$, the microprocessor proceeds to instruction 36 which begins the test program. It can be seen, therefore, that if port 5 is not set to 8$\phi$ by the test box 16, the microprocessor will operate in its normal mode to execute its machine control program. However, with the test box 16 connected as shown in FIG. 1, and with the switches in port 5 operated to set port 5 to 8$\phi$, the microprocessor executes only the test program and ignores the machine control program.

Referring to FIG. 4, there is shown an exemplary test sequence instruction format for testing the microprocessor. To start the test sequence, port 5 is first set to 8$\phi$ and the microprocessor is reset. This is achieved by closing the switch in column 7 of port 5 and closing a reset switch 20b. The latter switch is coupled to a reset lead (not shown) on the microprocessor 10.

This operation causes the microprocessor to return to instruction 28, to read port 5, and to proceed to the test program beginning with instruction 36. The microprocessor then proceeds through instructions 38 and 40, reading port 5 and looping through instructions 36–40 either until port 5 equals $\phi$8 (a condition to be described hereinafter) or until port 5 equals $\phi$1.

While the microprocessor is looping through instructions 36–40, the operator sets port 5 to equal $\phi\phi$ (FIG. 4, Test Sequence) and observes the condition of the LEDs. If the microprocessor is operating properly and no input/output leads (bits) are being held in a logic T condition by the machine 12, all LEDs for ports $\phi$, 1, 4 and 5 will be off. This check reminds the operator that the machine 12 must be adjusted so that it is not sending data to the microprocessor so as to hold any of the input/output leads 14 at a logic level. If the machine is holding any of the leads at a logic T, the machine must be adjusted as, for instance, by rotating cams, etc. to release each lead of the input/output ports from any logic level which is fixed by virtue of the status of the machine. Once that release has been effected, the test sequence can continue.

Assuming that all ports are released and the operator is ready to test port $\phi$ (Test 1 of FIG. 4), port 5 is set to $\phi$1 by closing the switch in column $\phi$ of port 5. This causes the microprocessor to proceed from instruction 40 to instruction 42 to set internal microsecond and millisecond counters to zero. Thereafter, instruction 44 causes the microprocessor to load an internal register (or accumulator) with 8$\phi$. By instruction 46, the contents of the register (8$\phi$) are written to port $\phi$. The eight bits on the leads associated with port $\phi$ then have the binary status T F F F F F F F. The logic T present at lead (bit) 7 causes the LED in column 7 of port 5 to illuminate as an indication of the presence of that test logic T.

Instruction 48 causes the microsecond counter to be decremented by one count and instruction 50 causes the microprocessor to determine if the microsecond counter has been decremented to $\phi$. If that decrementation has not been completed, the microprocessor loops through instructions 48 and 50 for approximately ten microseconds. When the microsecond counter has been decremented to $\phi$, the microprocessor proceeds to instruction 52 for decrementing the millisecond counter once. Instruction 54 checks the status of the millisecond counter and, if it has not been decremented to $\phi$, the microprocessor returns to instruction 48 and continues looping through instructions 48 and 50 until the microsecond timer has been decremented to zero again. The microsecond counter continues to be decremented 256 times, after which the millisecond timer is decremented once. The decrementating of the microsecond and millisecond counters repeats until the millisecond counter is decremented to zero. Preferably, the millisecond timer was preset such that the looping continues for 800 milliseconds in order to keep the port 5, column 7 LED lit for that duration so that the operator has the opportunity to notice it.

Next, instruction 56 causes the logic levels present on all bits or leads of port $\phi$ to be read back into the register, and instruction 58 causes the microprocessor to determine if the status of the register=$\phi$. At this point in the program port $\phi$ was not equal to $\phi$, so the microprocessor proceeds to instruction 60.

On the first pass through instruction 58, the status of the register is T F F F F F F F (binary). By instruction 60, the logic T is shifted right by one bit to change its status to F T F F F F F F. Then the microprocessor returns to instruction 46 for writing the last status of the register to port $\phi$. If the microprocessor is functioning properly, port $\phi$ will have the status F T F F F F F F, causing the lead in port 5, bit 7 to extinguish and the next adjacent LED (bit 6) to illuminate. The microprocessor continues through instructions 48–54 to hold the illuminated LED on for 800 milliseconds and then, by virtue of instruction 56, reads the status of port $\phi$ back to the register.

Because port $\phi$ still is not equal to $\phi$, instruction 60 is executed again to shift the logic T therein to the right to give F F T F F F F F. Then, instructions 46 through 54 are executed again and the LED of port $\phi$, bit 5 is illuminated for 800 milliseconds.

The microprocessor continues looping through instructions 46 through 60 until the logic T in the register has been shifted right eight times and a logic T has been written to each bit of port $\phi$. If each input/output lead of port $\phi$ is functioning properly, the logic T will propagate along port $\phi$ from bit 7 to bit $\phi$, and the LEDs of port $\phi$ will illuminate successively. That is, a light will propagate down the row of the LEDs of port $\phi$ to reflect the propagation of the test logic level (logic T) along the bits of port $\phi$. Such propagation occurs, however, only when each input/output lead or bit of port $\phi$ can be set and cleared as described above.

When the register has been shifted right eight times, its contents will be equal to $\phi$ (assuming that the microprocessor is functioning properly), whereupon instruction 58 causes the microprocessor to execute instruction 62 for reading port 5, previously set by the test box to $\phi$1. If the test box setting has not been changed, instruction 64 which checks the status of port 5 causes the microprocessor to return to instruction 42. Consequently, the microprocessor again propagates a logic T along port $\phi$ and the successive illumination of the LEDs of port $\phi$ reflects that propagation. Port $\phi$ continues to be checked and rechecked until the operator sets port 5 to $\phi$2 by closing the switch of port 5, bit 1

(Test 2 of FIG. 4), whereupon the microprocessor proceeds to instruction 66.

In the discussion above, it was assumed that each input/output lead of port $\phi$ was functioning properly to allow the test logic level to propagate along port $\phi$. However, if one of the input/output leads is stuck either at logic T or logic F, the test logic T will not propagate. For example, if the contents of the register are as shown in FIG. 5a and if one of the input/output leads is stuck at a logic T as indicated at 68 in FIG. 5b, the status of port $\phi$ will be as shown in FIG. 5b after the contents of the register have been written to port $\phi$. Thus two LEDs will be lit in response to the existence of two logic T's at port $\phi$. Moreover, when the contents of port $\phi$ are read back to the register, the status of the register will also be as shown in FIG. 5b. Upon shifting the contents of the register, the logic T indicated at 68 will be shifted by 1 bit position. Then, upon writing the contents of the register to port $\phi$ again, port $\phi$ will have three logic T's. That process repeats until port $\phi$ has a logic T as indicated at 68 and logic T's at each subsequent bit position in the direction of register shifting. Hence, the test box will have a plurality of lit LEDs which stay lit, as opposed to a single propagating light when port $\phi$ is functioning properly. The operator will, of course, notice this indication of the microprocessor malfunction and replace the faulty microprocessor with a new one.

In the case where one input/output bit is stuck at a logic F, a different indication is given. For example, assume that the contents of the register are as shown in FIG. 6a and the status of port $\phi$ is as shown in FIG. 6b after writing the contents of the register to port $\phi$, and further assume that the F indicated at 70 is stuck in that state. After reading port $\phi$ again, shifting the T to the right and writing to port $\phi$, the F at 70 will not change to a T. Hence, no LEDs will be lit. Further, the F at 70 "absorbs" the T in the register so that, upon the next reading of port $\phi$, the register will have no T's. Thereafter, no T's will be written to port $\phi$ and no further LEDs will be lit. The operator will notice this condition by the discontinuance of the propagation of light across the LED display, starting with the LED associated with the bit stuck at F. Thus, an easily perceptible visual indication is generated of a faulty microprocessor.

To test port 1 of the microprocessor, the operator sets port 5 to $\phi 2$ (Test 2 of FIG. 4), whereupon instruction 64 sends the microprocessor to instruction 66 for once again setting the microsecond and millisecond timers. By instruction 72, $8\phi$ (hexadecimal) is loaded into the register and that value is written to port 1 according to instruction 74. Next, instructions 76, 78, 80 and 82 cause the microprocessor to loop for 800 milliseconds as described previously. When that looping is complete, the contents of port 1 are read into the register (instruction 84), and the register is checked to see if its value is not equal to $\phi$ (instruction 86). If so, the register is shifted right by one increment (instruction 88). Thereafter, the microprocessor returns to instruction 74 and continues through instructions 76–88 until the register has shifted 8 times and the value of port 1 equals $\phi$. If any bit of port 1 is stuck at logic T or logic F, the indication described above is given.

The microprocessor then proceeds to instruction 90 for reading the contents of port 5 and then to instruction 92 for checking the value of port 5. If port 5 is still set to $\phi 2$ by the test box, the microprocessor returns to instruction 66 for testing the operability of port 1 again.

When the operator desires to test port 4, the test box is used to set port 5 to $\phi 4$, whereupon the microprocessor proceeds from instruction 92 to sub-routine 94 for propagating a test logic T along port 4. Sub-routine 94 is not shown in any detail, but it may be exactly analogous to instructions 66 through 88 which were for testing port 1.

After the test logic T has been once propagated along port 4, instructions 96 and 98 cause the microprocessor to read the value of port 5 and to return to sub-routine 94 for additional testing of port 4. Such additional testing continues until the operator uses the test box to set port 5 to $\phi\phi$.

When port 5 is to be tested, the operator sets port 5 to $\phi\phi$ (Test 4 of FIG. 4) whereupon the microprocessor proceeds from instruction 98 to sub-routine 100. The latter sub-routine may be similar to sub-routine 94. The microprocessor stays in sub-routine 100 until the operator discontinues the microprocessor test by resetting the microprocessor by the reset switch 20b (FIG. 1). The resetting of the microprocessor causes the latter to return to instruction 28 and thence to the machine control program 34.

If it is desired to skip the machine control program and to test the machine itself, port 5 is set to $8\phi$ prior to resetting the microprocessor. This causes the microprocessor to proceed from instruction 28 through instructions 30–40 and to loop through instructions 36, 38 and 40 until the operator sets port 5 to $\phi 8$. When that occurs, the microprocessor exits instruction 38 and loops at X7 indefinitely. This latter operation places the microprocessor in a quiescent state in which it is electrically connected to the machine but in which it exercises no control over the machine. In addition, the closing or opening of any switches 20 on the test box does not affect the microprocessor. Only closing the reset switch 20b will bring the microprocessor out of the loop X7.

Next, the test box is cleared by setting port 5 back to $\phi\phi$ and the machine is ready for testing without interference from the microprocessor. The testing of the machine will, of course, depend on the type of machine to be tested and the way its input/output leads are connected to the microprocessor. Because such connections will be known, an appropriate test sequence can be provided to exercise the various functions of the machine and to monitor the functions of the machine by noting which LEDs on the test box become energized. By way of example only, if the machine contains a solenoid and a motor, the test sequence instructions, as indicated in FIG. 7, may provide that the switch associated with port 5, bit $\phi$ may be manipulated while examining the solenoid to insure proper mechanical and/or electrical operation. If it does not operate properly, the solenoid, its operating mechanism, or drive circuit is faulty. Further, the motor may be tested, for example, by setting port 5, bits 2 and 5 on and port $\phi$, bit 5 on. The machine test instructions may call for the motor to be on, for certain cams to rotate, and for microswitches to open and close. Proper operation may be indicated by the port 1, bit 2 LED cycling on and off. Hence, the test box may give a visual indication of the operating condition of the machine.

The test procedure immediately above is merely exemplary and is proper only for use with a particular machine connected to the microprocessor in a particular manner. Other machines will, of course, require a customized test sequence. However, the test system described herein is universal in that it can be adapted for use with any microprocessor controlling any machine. The test box itself can be used with any suitable microprocessor controlling any type of machine. All that generally needs to be customized for different microprocessors is the microprocessor test sequence of FIG. 4. The flow chart described above may need to be slightly modified for microprocessors having a different number of ports than that of the example. Each machine will, of course, have its own machine test instructions. Hence, a field test operator need only have the test box and a set of test sequence instructions for testing any microprocessor programmed to be tested and for testing any machine.

The test box itself is of simple design and can be tested by merely using a standard volt/ohm meter. Hence, there is little need for highly skilled persons to troubleshoot the test box. The testing of the microprocessor and the machine which it controls may also be tested by persons who are not highly skilled by merely following the step-by-step procedure of the test sequence instructions.

The invention is also useful in isolating a fault in a machine or microprocessor in which the fault occurs intermittently. For example, should a machine have an intermediate fault, the machine will frequently stop when the fault occurs, and its controlling microprocessor may loop in a program waiting for the next data input from the machine. If the machine malfunction does not last for a long period of time, that malfunction may be difficult to isolate. However, the test box may be connected to the microprocessor ports and left there until the intermittent malfunction occurs again. At that time, an operator need merely note which LEDs are lit on the test box. Comparing the status of the LEDs to a test sequence instruction sheet for that microprocessor/machine combination will frequently indicate where the malfunction resides, or at least isolate the malfunction to a particular area of the machine. Knowing where the malfunction resides will permit quick correction of it.

Although the invention has been described in terms of specific structure and testing steps, it will be obvious to those skilled in the art, in light of this disclosure, that many modifications and alterations may be made thereto. For example, the invention has been described in terms of testing a single chip microprocessor, but the theory may be extended to cover multi-chip microprocessors. Further, the test box may be modified, for example, to include more or less switches and light-emissive devices, and the electrical connections in the test box may also be modified without departing from the invention. Accordingly, it is intended that all such modifications and alterations be included within the spirit and scope of the invention as defined by the appended claims.

What is claimed is:

1. A method of independently testing both a microprocessor having a plurality of input/output ports, each port having a plurality of input/output leads, and a machine whose functions are controlled by the microprocessor, comprising:
   (a) releasing each lead of the input/output ports from any logic level which is fixed by virtue of the status of the machine;
   (b) writing, by means of a test program in the microprocessor, a test logic level to a first lead of a selected input/output port and propagating said test logic level from lead to lead of the selected input/output port such that only a properly functioning input/output lead assumes the test logic level and then reverts to an opposite logic level when the test logic level propagates to the next lead;
   (c) sensing the logic level associated with each lead of the selected input/output port and generating a visual indication of which leads assume the test logic level;
   (d) repeating steps (b) and (c) for the remaining input/output ports of the microprocessor;
   (e) causing the microprocessor to assume a quiescent state in which it is electrically connected to the machine but in which state it exercises no control over the machine; and
   (f) applying, by means external to the microprocessor, a machine-run logic level to at least one port normally coupling logic levels from the microprocessor to the machine, said machine-run logic level being selected to effect a known function of the machine,
   whereby, the operability of each input/output port of the microprocessor is determined by a visual indication of the test logic level propagating along each input/output port, and the functions of the machine are checked independently of the microprocessor to isolate fault conditions.

2. A method as set forth in claim 1 wherein the writing of a test logic level to a first lead and the propagation thereof along a selected input/output port is effected by storing in a register in the microprocessor a logical word having bits equal in number to the number of leads in an input/output port, said word having a logic true in a position corresponding to the first lead in the selected input/output port and logic false in the remaining positions, writing the contents of the register to the selected input/output port, reading the logic levels on each lead of the selected input/output port back into the register, shifting the contents of the register in a given direction by one increment, and repeatedly writing the contents of the register back to the selected input/output port, reading the logic levels on each lead of the selected input/output port back to the register, and shifting the contents of the register until said logic true has been written to each lead of the selected input/output port,
   whereby a properly functioning input/output lead will assume the logic true received from the register and revert to a logic false upon propagation of said logic true to the next adjacent lead, resulting in a single logic true propagating step-by-step along the input/output port, whereas an input/output lead which is improperly stuck at a logic true results in multiple logic trues at the selected input/output port, and an input/output lead which is improperly stuck at a logic false results in the discontinuance of the propagation of said logic true.

3. A method as set forth in claim 1 wherein the generation of a visual indication of each sensed logic level is effected by establishing a pattern of light-emissive devices equal in number to the number of input/output leads in the selected input/output port, each such device being associated with one such lead and being energized when its associated lead assumes the test logic level, whereby the proper propagation of said test logic level is indicated by the energization and de-energization of successive, adjacent light-emissive devices.

4. A method as set forth in claim 1 wherein the microprocessor is caused to assume a quiescent state by causing the microprocessor to enter and remain in a loop in the test program in response to a given lead being externally set to a given logic level, whereby the microprocessor remains energized and electrically connected to the machine, yet the microprocessor relinquishes control over the machine so that the machine functions can be tested independently of the microprocessor and without the damage to the microprocessor which may otherwise result from the manual removal of the microprocessor from connection to the machine.

5. A method as set forth in claim 1 wherein the microprocessor includes a machine control program and a programmed instruction for executing the machine control program only if a given input/output port has a status other than a predetermined status, and for initiating the transmission to and propagation of the test logic level only if said input/output port has said predetermined status, whereby the testing of the microprocessor is initiated by merely setting said given input/output port to said predetermined status by means external to the microprocessor.

6. A method of testing a microprocessor having a plurality of input/output ports, each having a plurality of input/output leads, comprising:

(a) storing in a register in the microprocessor a logical word having bits equal in number to the number of leads in a selected input/output port, said word having a test logic level in a bit position corresponding to the position of a first lead in the selected input/output port and logically different levels in the remaining bit positions;

(b) writing the contents of the register to the selected input/output port;

(c) reading the logic levels on each lead of the selected input/output port back into the register;

(d) shifting the contents of the register in a given direction by one increment;

(e) repeatedly writing the contents of the register back to the selected input/output port, reading back to the register the logic levels on each lead of the selected input/output port, and shifting the contents of the register until said test logic level has been written to each lead of the selected input/output port, and (f) generating a visual indication of the logic level of each lead in the selected input/output port by connecting to the output port a plurality of light-emissive devices equal in number to the number of input/output leads in the selected input/output port, each such device being associated with one such lead and being energized only when its associated lead assumes the test logic level;

whereby the operability of the microprocessor is tested without manually removing it from its normal operating position, thus avoiding damage to the microprocessor as a result of manual handling, and the light-emissive devices are successively energized and de-energized in response to the propagation of the test logic level along the selected input/output port to permit easy visual determination of the operability of the selected input/output port.

7. A system for testing the operability of a microprocessor having a plurality of input/output ports each having a plurality of input/output leads, comprising:

means for transmitting a test logic level to a first lead of a selected input/output port and for effecting propagation of said test logic level along each lead of the selected input/output port, such that only a properly functioning input/output lead assumes the test logic level at any given moment and then reverts to an opposite logic level when the test logic level propagates to the next lead, and test means external to the microprocessor for sensing the logic level associated with each lead of the selected input/output port and for generating a visual indication of which leads assume the test logic level, whereby, as the test logic level propagates along the selected input/output port, said test means generates a visual indication of its propagation to permit an operator to ascertain the operability of the microprocessor without manually removing it from its normal electrical connections.

8. A system as set forth in claim 7 wherein said test means includes an array of light-emissive devices, one associated with each lead of the selected input/output port, and means for connecting each light-emissive device to its associated input/output lead such that a light-emissive device is energized only when its associated input/output lead assumes said test logic level whereby the propagation of said test logic level along the selected input/output port causes a corresponding propagation of light along the array of light-emissive devices.

9. A method of isolating faults in a machine/microprocessor combination in which the microprocessor has a plurality of input/output ports, each port having a plurality of input/output leads, comprising:

(a) storing in a register in the microprocessor a logical word having bits equal in number to the number of leads in a selected input/output port, said word having a test logic level in a bit position corresponding to the position of a first lead in the selected input/output port and logically different levels in the remaining bit positions;

(b) writing the contents of the register to the selected input/output port;

(c) reading the logic levels on each lead of the selected input/output port back into the register;

(d) shifting the contents of the register in a given direction by one increment;

(e) repeatedly writing the contents of the register back to the selected input/output port, reading back to the register the logic levels on each lead of the selected input/output port, and shifting the contents of the register until said test logic level has been written to each lead of the selected input/output port;

(f) generating a visual indication of the logic level of each lead in the selected input/output port by connecting to the output port a plurality of light-emissive devices equal in number to the number of input/output leads in the selected input/output port, each such device being associated with one such lead and being energized only when its associated lead assumes the test logic level;

(g) causing the microprocessor to enter and remain in a loop in the test program in response to a given lead being externally set to a given logic level; and (h) transmitting, by means external to the microprocessor, a machine-run logic level to at least one port normally coupling logic levels from the microprocessor to the machine, said machine-run logic level being selected to effect a known function of the machine, whereby the operability of the microprocessor is tested without manually removing it from its normal operating position and while remaining energized and electrically connected to the machine, and the microprocessor relinquishes control over the machine so that the machine functions can be tested independently of the microprocessor.

10. A system for independently testing both a microprocessor having a plurality of input/output ports, each port having a plurality of input/output leads, and a machine whose functions are controlled by the microprocessor, comprising:

means for transmitting a test logic level to a first lead of a selected input/output port and for effecting propagation of said test logic level along each lead of the selected input/output port such that only a properly functioning input/output lead assumes the test logic level at any given moment and then reverts to an opposite logic level when the test logic level propagates to the next lead; and means for sensing the logic level associated with each lead of the selected input/output port and for generating a visual indication of which leads assume the test logic level;

means for placing the microprocessor in a quiescent state in which it remains energized but exercises no control over the machine; and means for applying a machine-run logic level to at least one port normally coupling logic levels from the microprocessor to the machine, said machine-run logic level being selected to effect a known function of the machine.

11. A system as set forth in claim 10 wherein said means for transmitting a test logic level, said means for placing the microprocessor in a quiescent state, and said means for applying a machine-run logic level include an array of switches each associated with a lead of the input/output ports and each adapted to apply a given logic level to its associated lead, one of said switches being operable to apply a logic level selected to place the microprocessor in a quiescent state and other of said switches being operable to apply to their respective leads logic levels for exercising the machine while the microprocessor is quiescent.

12. A system as set forth in claim 11 wherein said visual indication generating means includes an array of light-emissive devices, one associated with each lead of an input/output port, wherein said light-emissive devices and said switches are mounted in a single housing,, wherein each light-emissive device is coupled between a source of voltage and a connection to an input/output lead, and each switch is associated with one light-emissive device and one input/output lead and is connected so as to couple its associated input/output lead to a reference potential when closed and to open the connection between the reference potential and the input/output lead when opened, whereby a test logic level appearing on an input/output lead causes the associated light-emissive device to be energized when the associated switch is open, and a reference potential is applied to an input/output lead whenever a switch is closed in order to exercise a given machine function when the microprocessor is in a quiescent state.

* * * * *